United States Patent
Hägglund

(10) Patent No.: US 6,285,913 B1
(45) Date of Patent: Sep. 4, 2001

(54) METHOD AND CONTROL SYSTEM FOR COMPENSATING FOR FRICTION

(75) Inventor: Tore Hägglund, Lund (SE)

(73) Assignee: Alfa Laval Automation AB, Malmo (SE)

( * ) Notice: Subject to any disclaimer, the term of this patent is extended or adjusted under 35 U.S.C. 154(b) by 0 days.

(21) Appl. No.: 09/043,521

(22) Filed: Mar. 19, 1998

Related U.S. Application Data

(63) Continuation of application No. PCT/SE96/01166, filed on Sep. 20, 1996.

(30) Foreign Application Priority Data

Sep. 22, 1995 (SE) .................................................. 9503286

(51) Int. Cl.$^7$ .............................. G05B 13/02; F16K 29/00
(52) U.S. Cl. ................................................. 700/45; 700/44
(58) Field of Search ..................... 700/45, 44, 28

(56) References Cited

U.S. PATENT DOCUMENTS

| | | | |
|---|---|---|---|
| 3,562,620 | 2/1971 | Haslehurst | 318/616 |
| 3,797,320 | * 3/1974 | Clampitt | 73/496 |
| 4,192,551 | * 3/1980 | Weimer et al. | 299/1.4 |
| 4,282,467 | * 8/1981 | Gruesbeck | 318/561 |
| 4,336,718 | * 6/1982 | Washburn | 73/497 |
| 4,432,033 | 2/1984 | Brundage | 361/152 |
| 4,464,977 | * 8/1984 | Brundage | 91/376 R |
| 4,481,768 | * 11/1984 | Goshorn et al. | 60/327 |
| 4,546,403 | * 10/1985 | Nielsen | 361/154 |
| 4,562,393 | * 12/1985 | Loyzim et al. | 318/599 |
| 4,679,585 | * 7/1987 | Ewing | 137/486 |
| 5,062,404 | * 11/1991 | Scotson et al. | 123/399 |
| 5,374,884 | 12/1994 | Koren et al. | 318/632 |
| 5,673,166 | * 9/1997 | Hoffman | 361/160 |
| 5,685,149 | * 11/1997 | Schneider et al. | 60/528 |
| 5,947,086 | * 9/1999 | Hoshino et al. | 123/399 |

FOREIGN PATENT DOCUMENTS

| | | |
|---|---|---|
| 600 219 | 6/1978 | (CH) . |
| 0 229 632 | 7/1987 | (EP) . |
| 0 461 288 | 12/1991 | (EP) . |
| 0 461 299 | 12/1991 | (EP) . |

OTHER PUBLICATIONS

International Search Report.
Armstrong–Helouvry, B., Dupoint, P., De Wit, C., "A Survey of Models, Analysis Tools and Compensation Methods for the Control of Machines with Friction", 1994, UK, *Automatica*, vol. 30, No. 7, pp. 1083–1138.

* cited by examiner

Primary Examiner—Paul P. Gordon
Assistant Examiner—Edward F. Gain
(74) Attorney, Agent, or Firm—Fish & Richardson P.C.

(57) ABSTRACT

A method for compensating for static friction in an actuating device includes the steps of generating an actual signal $y_2(t)$ corresponding to a quantity which is controllable by the actuating device, generating a set value signal $y_1(t)$ generating a control signal $s_1(t)$ based on the set value signal $y_1(t)$ and the actual value signal $y_2(t)$, and supplying the control signal to the actuating device for controlling the same. The method also includes the steps of generating an intermittent signal $s_2(t)$ compensating for friction, sensing the sign of the derivative with respect to time of the control signal $s_1(t)$, giving the signal $s_2(t)$ compensating for friction the same sign as the derivative, and adding the signal $s_2(t)$ compensating for friction to the control signal $s_1(t)$ before supplying the same to the actuating device.

9 Claims, 3 Drawing Sheets

METHOD AND CONTROL SYSTEM FOR COMPENSATING FOR FRICTION

This application is a continuation of PCT/SE96/01166, filed Sep. 20, 1996, which designates the United States of America, and claims the benefit of priority Swedish application no. 9503286-8, filed Sep. 22, 1995.

FIELD OF THE INVENTION

The present invention relates to controlling in the presence of static friction, especially to reducing the effects of static friction in the controlling of valves.

BACKGROUND ART

Static friction, so-called stiction, occurs everywhere in the environment. As a rule, the friction when passing from rest to motion (static friction) is greater than the friction during the continuance of the motion (sliding friction). To move an object from its resting position, a force greater than the sliding friction must thus be applied to the object.

The existence of static friction is a general problem in all types of controlling that means that an actuating means is to be stopped and later to be moved again. The term actuating means signifies in this context the subject of the control, i.e. the component/components actuated during the control.

In valves there is static friction, for instance, between the valve spindle and the packing box, especially if this is tightened firmly. Moreover, static friction may occur in other positions in a valve, for instance, between ball and seat in a ball valve.

Static friction manifests itself by so-called stick-slip motion, i.e. the valve sticks owing to the friction in a certain position, which requires a certain amount of force to overcome the resistance from the stiction. Once the static friction resistance has been overcome and the actuating means moves towards its desired position, the applied force is too great relative to the sliding friction, which means that the actuating means will be accelerated and therefore pass the desired position before the control system has time to brake the actuating means. This problem is particularly pronounced when small valve movements are desired, or when the time constant of the control system is great and, consequently, the controlling occurs slowly relative to the motion of the actuating means.

When controlling, for example, a flow passing through a valve, static friction in the valve thus gives rise to oscillations in the controlled flow round the set value thereof. If the static friction increases during operation, for instance, owing to wear or clogging, the size of the oscillations will increase.

It is desirable to reduce the effect of the static friction in valves, of which a large number may be included in process equipment, since the above-described oscillations in processes give rise to an increased power consumption and waste of raw material. As a rule, it is however not economically defensible to interrupt the process and take care of the problems of friction each time an unacceptably great stick-slip motion is discovered in one of the valves. For this reason, it is desirable to be able to compensate for static friction during operation.

A difficulty in compensating for static friction is that this may vary with valve position, time and between different cases of operation. For instance, the valve is in most cases worn unevenly, and therefore the friction is not the same in different positions of the valve. Moreover, variations in temperature cause corresponding variations in static friction, since at high temperatures the material expands and causes increased friction. In a process, the temperature can, of course, vary both in time and between different cases of operation. Also the valve becoming dirty may give rise to variations in friction.

A previously well-known technique of compensating for static friction is called dithering. This technique is disclosed in, inter alia, U.S. Pat. No. 3,562,620 in connection with the controlling of electric motors, and in CH-600,219 in connection with the controlling of a hydraulic valve. Dithering implies that a high-frequency signal is superposed on, i.e. added to, the control signal. The amplitude of the signal should be sufficiently high to overcome the static friction, and the frequency of the signal should be so high that the disturbance generated by such superposing is above the relevant frequency range of the system. The mean value of the superposed signal is zero, which results in the high-frequency valve constantly oscillating on the spot. This high-frequency oscillation prevents the valve from sticking in the above-described fashion, thereby avoiding the problem of stick-slip motion.

The main drawback of dithering is precisely that the valve is forced to oscillate continuously, which, of course, results in an increased wear of all moving parts of the valve. Besides, this technique is not usable to overcome and compensate for static friction in valves where the control signal will be low-pass filtered (integrated) in the actuator, such as in pneumatically controlled valves. This problem will be further discussed below with reference to the drawings.

A further compensating technique, so-called impulsive control, is described in "A Survey of Models, Analysis Tools and Compensation Methods for Control of Machines with Friction", Armstrong-Hélouvry et al, Automatica, Vol. 30, No. 7, pp 1083–1138. Impulsive control means that the actual control signal is generated as a sequence of pulses, and therefore both controlling and overcoming of friction are accomplished by means of the same signal. Each pulse results in a certain movement of the actuating means. Variations with respect to time in the static friction consequently cause corresponding variations with respect to time in the movement of the actuating means. To obtain a control signal which as much as possible is independent of any variations in static friction, the pulses must have a high amplitude and a short duration.

Impulsive control suffers from, inter alia, the drawback that the static friction resistance must be known, at least in the sense that the generated pulses must have a sufficient amplitude to overcome every conceivable friction resistance. Moreover, the pulses have a short duration, which means that a high-frequency signal is to be transferred to the actuating means. Therefore, this technique is not applicable in valves having a low-pass filtration of the control signal, for instance, pneumatically controlled valves.

OBJECTS OF THE INVENTION

An object of the present invention is to overcome, wholly or partly, the problems connected with prior art technique, i.e. to provide a method and a control system reducing the effect of static friction when controlling an actuating means and causing a minimum wear of the moving parts of the actuating means. The method and the control system according to the present invention should also be substantially independent of variations in the static friction.

A further object of the invention is to suggest a method and a control system which can be used for compensating for static friction in actuating means having low-pass filtering components.

The invention is specifically, but not exclusively, adapted to be used for the controlling of valves.

SUMMARY OF THE INVENTION

According to the invention, these and other objects which will appear from the following description have been achieved by a method and a control system according to appended claims 1 and 7, respectively. Preferred embodiments of the invention are defined in the appended subclaims.

In summary, the idea of the invention is that pulses, which are small in relation to the static friction, are superposed on the control signal. The sign of each pulse conforms with the sign of the derivative with respect to time of the control signal when generating the pulse. Thus, the idea of the technique is that the pulses coact with the control signal and "knock" at the actuating means in the same direction as the control signal tends to move it. Thanks to this knocking, the friction will be overcome at an earlier stage in the course of the control signal, i.e. the stick phase is shortened. Owing to the small energy content of the pulses in relation to the static friction, the overshoot of the actuating means round the desired position will be relatively small once the static friction has been overcome, i.e. the slip phase is shortened.

Without compensation for static friction, the quantity controlled by the actuating means will, as mentioned above, perform considerable oscillations round the desired value owing to stick-slip motion. While using the invention, this quantity will have significantly more rapid and smaller oscillations round the set value.

BRIEF DESCRIPTION OF THE DRAWINGS

The invention will now be described, for the purpose of exemplification, with reference to the accompanying drawings, which illustrate a currently preferred embodiment and in which.

DESCRIPTION OF EMBODIMENTS OF THE INVENTION

Figure 1:
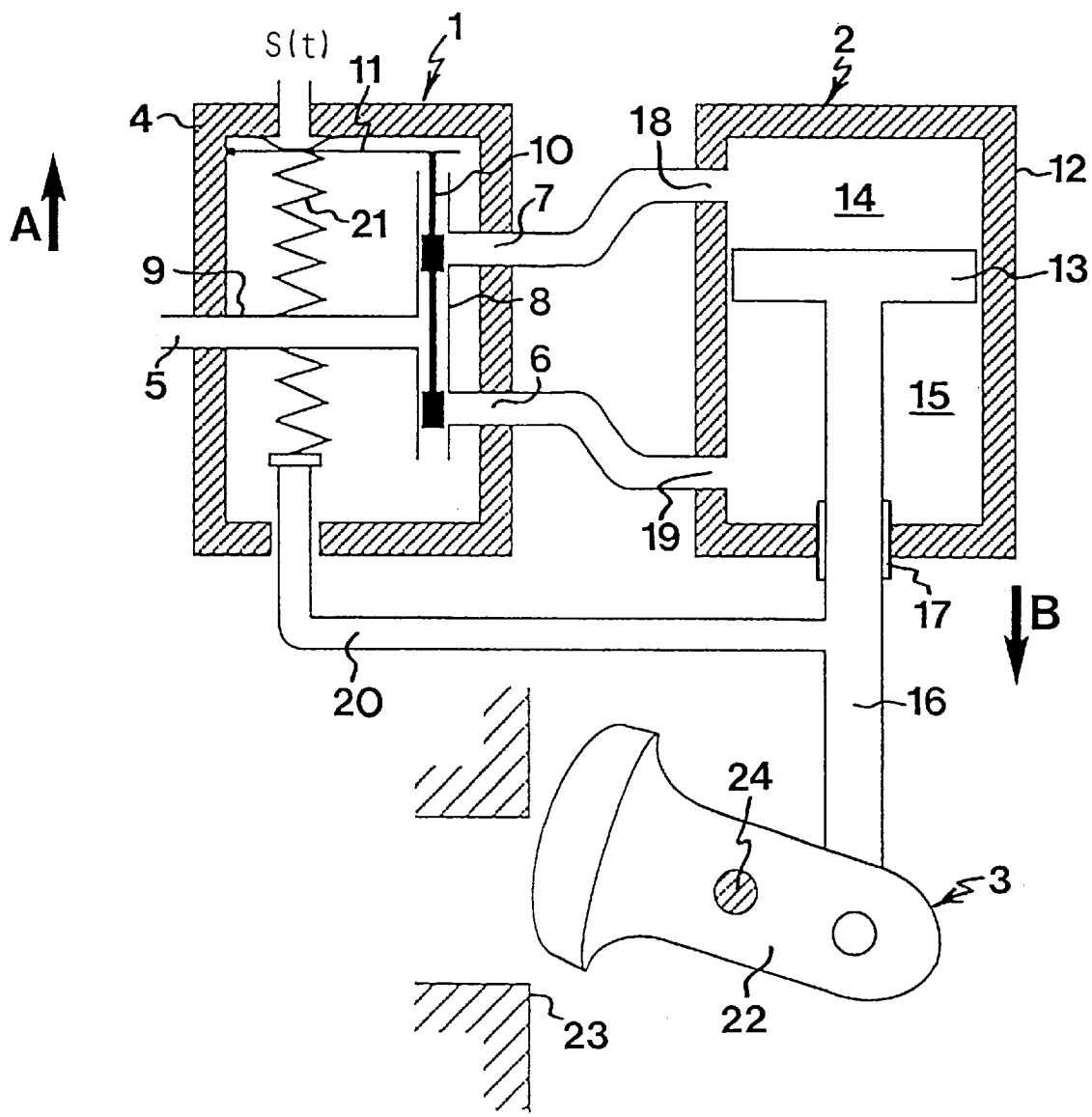
FIG. 1 is a schematic view of a pneumatic control valve.

FIG. 1 is a schematic view of one type of pneumatic control valve. The three main parts of the control valve are a valve positioner 1, an actuator 2 and a valve 3, the actuator 2 and the valve 3 together forming an actuating means, i.e. the means subjected to the above-mentioned static friction.

The valve positioner 1 is arranged in a casing 4, which is provided with an air supply opening 5, a lower connecting port 6 and an upper connecting port 7. The air supply opening 5 is connected to a compressed air source (not shown) applying a constant air pressure to the valve positioner 1. The connecting ports 6, 7 are interconnected by means of a first duct 8, which in turn is connected to the air supply opening 5 by means of a second duct 9. In the first duct 8, a pilot valve 10 is arranged in the form of a movable slide, which is connected to an operable diaphragm 11.

The actuator 2 comprises a cylinder 12 and a piston 13 movably arranged in the cylinder and dividing the cylinder into an upper chamber 14 and a lower chamber 15. The piston 13 is connected to a valve spindle 16 extending through one end wall of the cylinder 12. The spindle 16 is sealed against the cylinder 12 by means of a seal 17, a so-called packing box. The cylinder 12 further has two connecting ports 18, 19 which are each connected, by means of air ducts, to one of the connecting ports 6, 7 of the valve positioner 1. A beam 20 is arranged on the valve spindle 16. The beam 20 is inserted into the valve positioner 1 and is connected, by means of a helical spring 21, to the operable diaphragm 11.

The valve 3 comprises a valve cone 22, which is pivoted to the valve spindle 16. The valve cone 22 is arranged on a shaft 24 for rotation in front of a valve seat 23.

The control valve is operated by a control signal s(t) moving the diaphragm 11 in the direction of arrow A, whereby a corresponding movement of the slide 10 is accomplished. According to the size of the control signal, part of the upper connecting port 7 thus is uncovered, whereupon air flows into the upper chamber 14 of the actuator 2. At the same time, part of the lower connecting port 6 is uncovered and air flows out of the lower chamber 15 of the actuator 2. The thus established difference in pressure between the chambers 14, 15 generates a force acting on the piston 13 and moving this and the valve spindle 16 in the direction of arrow B. The movement of the valve spindle 16 is transferred to the valve cone 22, which is rotated relative to the valve seat 23. The movement is also transferred to the beam 20, and consequently the spring 21 is stretched. The force which owing to this stretching is generated in the spring 21 returns the diaphragm 11 and the slide 10 to the state of equilibrium shown in FIG. 1. The valve cone 22 thus has been moved to a new position and will remain in this position as long as the control signal s(t) is not changed.

Of course, the valve can be operated in the opposite direction by an opposite movement of the diaphragm 11.

The operation of the control valve is rendered difficult by static friction, which may occur, for instance, in the seal 17 between the valve spindle 16 and the cylinder 12, or between the cone 22 and the seat 23 if these are mechanically connected with each other. As the control valve is worn, the static friction will increase and, besides, vary with valve position, time and between different cases of operation. The control valve will thus jam and tend to stick in different positions, and therefore the problems described by way of introduction will arise when controlling the flow passing through the control valve.

These problems cannot be circumvented either by applying to the valve spindle 16 a high-frequency oscillation about a state of equilibrium, i.e. by dithering, or by using impulsive control, since the compression-air-distributing pilot valve 10 cannot, owing to the inherent inertia of the system, transfer to the piston 13 such vibrations at a sufficiently high frequency and amplitude.

Figure 2:
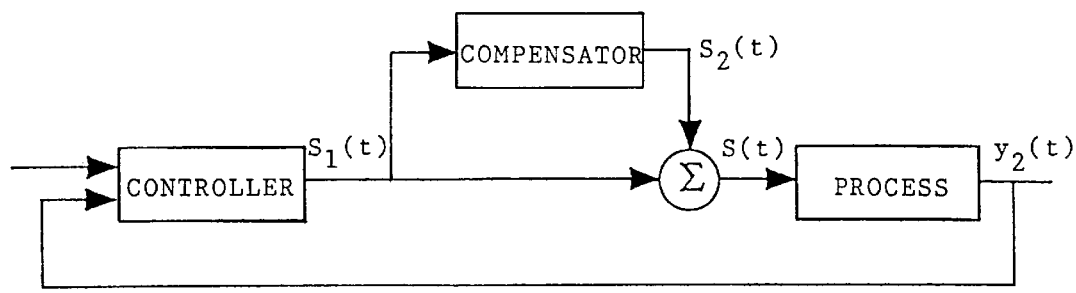
FIG. 2 is a block diagram for illustrating a control system according to the invention.

FIG. 2 is a block diagram of a system according to the present invention for controlling a process, for instance, the flow passing through a control valve. A set value signal $y_1(t)$ is generated and fed to a controller. An actual value signal $y_2(t)$, which is characteristic of the process, is generated, sensed and fed to the controller. On the basis of the set value signal $y_1(t)$ and the actual value signal $y_2(t)$, a control signal $s_1(t)$ is generated. A compensator senses the control signal $s_1(t)$ from the controller and emits an intermittent compensation signal $s_2(t)$ which is added to said control signal, whereupon the formed control signal $s(t)$ is fed on to the process.

In the normal case, the controller is a PID controller, which is controlled by the parameters amplification, integration time and derivation time. However, it should be pointed out that every type of controller is usable within the scope of the invention.

Figure 3:
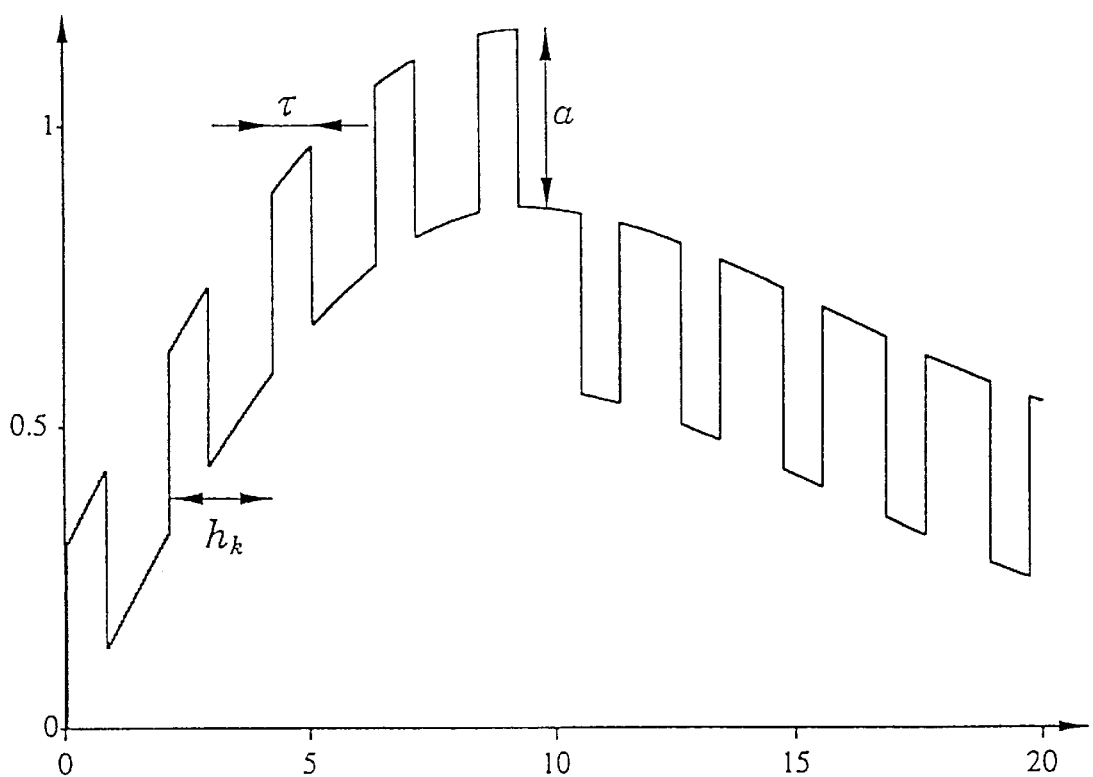
FIG. 3 shows a typical control signal according to the invention, the size of the superposed pulses being exaggerated for reasons of clarity.

FIG. 3 illustrates an example of an inventive control signal fed to the process. In the shown example, short pulses of equal amplitude and duration are thus added to the output signal of the controller. The sign of the pulses conforms with the sign of the derivative with respect to time of the control signal at the time of the addition, i.e. the pulses act on the valve spindle in the same direction as the control signal.

The compensation technique can be described as follows: the superposed pulses coact with the control signal and intermittently knock at the valve spindle in the same direction as this is affected by the control signal. The knocks result in the static friction being overcome earlier than is normal during the course of the control signal, i.e. the jamming valve begins to move earlier. When the valve has been released from its locked position, the control signal changes direction and is superposed on pulses having the opposite sign.

The output signal $s_2(t)$ from the compensator may, as shown in FIG. 3, be a pulse sequence, which is characterised by the distance $h_k$ between the pulses, the amplitude a of the pulses and the width τ of the pulses. The energy content of a pulse is determined by the product of its amplitude and width and should, according to that stated above, not be so great that the force exerted by the pulse and acting on the valve cone exceeds the minimum stiction.

The amplitude a should be kept relatively low. As appears from FIG. 1, great deflections of the pilot valve 10 result in the connecting ports 6, 7 being completely uncovered. The air in the lower chamber 15 will then be blown out in an uncontrolled manner from the lower chamber of the actuator 2, while air flows into the upper chamber 14 of the actuator 2. Normally, the piston is subjected to a certain balancing counterpressure exerted by the air in the lower chamber 15. An uncontrolled emptying as described above results in the complete disappearance of this counterpressure, and therefore the piston, once moved in the desired direction, is subjected to an unnecessarily great force relative to the friction to be overcome. Consequently, there is a risk that the slip phase is prolonged, which may counteract the purpose of the invention.

Tests have shown that the amplitude should suitably be in the range 1–10% of the total controlling range of the control signal.

Since it is desirable to keep the energy content of the pulses down, also the pulse width τ should be relatively small. For practical reasons, the pulse width cannot be smaller than the sampling interval of the controller. When a controller having a sampling time of 0.2 s is used to control a 150 mm valve, 0.2–0.4 s was found to be a suitable pulse width. When controlling larger valves, the pulses may probably have a longer duration.

The distance $h_k$ between subsequent pulses must be greater than the sampling time of the controller and also greater than the pulse width τ. Said distance should, however, be so short in relation to the integration time of the controller that the base level of the pulses does not change too much between subsequent pulses. By having too great a distance between the pulses, the control signal between the pulses will have time to approach the slip position, and therefore the pressure drop over the piston, once the pulse is applied to the control valve, will be too great in relation to the static friction, which may result in considerable oscillations of the "controlled" flow.

In one test, a flow of water was controlled by means of a very worn 150 mm ball valve. As controller, use was made of a PI controller having the amplification 1, the integration time 5 s and the sampling interval 0.2 s. The flow signal was fed through a first order low-pass filter having the time constant 5 s, before it was fed back to the controller. The test was carried out by using and without using a compensator. The compensator was set for the amplitude 3%, the pulse width 0.4 s and the pulse distance 1 s.

Figure 4A:
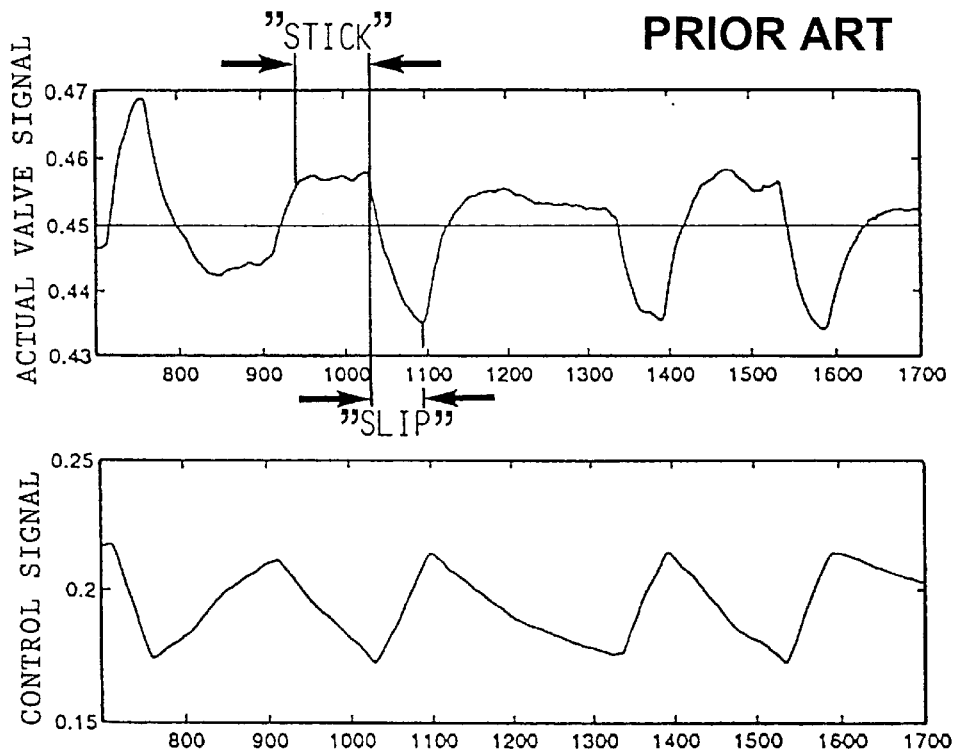
FIG. 4a shows an experimentally registered control signal and an associated actual value signal in conventional flow control.
Figure 4B:
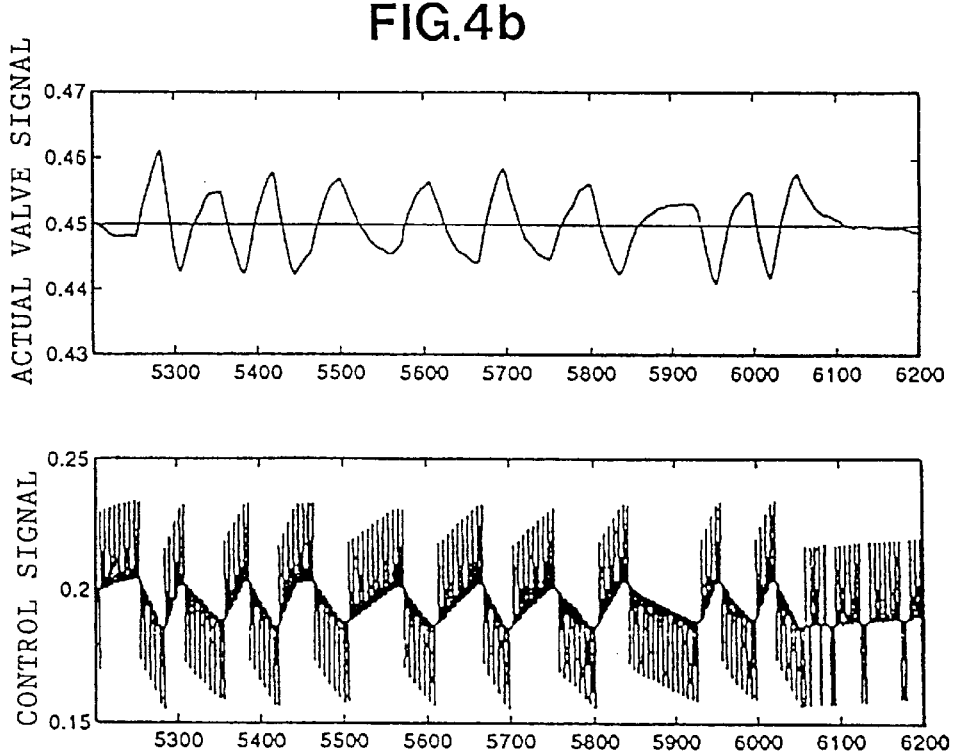
FIG. 4b shows signals corresponding to those in FIG. 4a, in flow control according to the present invention.

FIG. 4a shows the result of the test in conventional controlling by means of a pure PI controller, i.e. without any compensator. FIG. 4b shows the result of the corresponding test, using a control system according to the present invention. The set value as set in the test is indicated by the horizontal line in the actual value diagrams. It is obvious that the control system according to the invention gives rise to considerably shorter stick and slip phases than does a conventional control system. It should be emphasised that the total controlling range of the control signal in FIGS. 4a and 4b is between 0 and 1.

The use of the compensator according to the invention thus reduces the amplitude of the oscillations and increases the frequency of the oscillations, meaning that the error in controlling decreases significantly.

Since the energy content of the pulses is smaller than the static friction, the controlling will function in a satisfactory manner even if the friction increases or varies during operation.

It will also be appreciated that the control valve is subjected to wear which is less that in conventional methods of compensation.

Although the above description concerns valves only, the problems in connection with static friction are, of course, applicable to other technical fields, for instance, positioning by means of electric motors, where the stiction must be overcome in order to carry out a movement of some sort of actuating means.

What is claimed is:

1. A method for compensating for static friction in an actuating means, comprising a repetitive sequence of the following steps:

generating an actual value signal corresponding to a quantity which is controllable by the actuating means, generating a set value signal, generating a control signal based on the set value signal and the actual value signal, and supplying the control signal to the actuating means for controlling the same, and further comprising the steps of generating an intermittent signal compensating for friction, sensing the sign of the derivative with respect to time of the control signal, giving the signal compensating for friction the same sign as said derivative with respect to time, and adding the signal compensating for friction to said control signal before supplying the same to the actuating means.

2. The method as claimed in claim 1, wherein the signal compensating for friction is supplied as a pulse train.

3. The method as claimed in claim 2, wherein the force applied to the actuating means, during each pulse, by means of the signal compensating for friction is smaller than the static friction.

4. The method as claimed in claim 3, wherein the distance between said pulses is constant.

5. The method as claimed in claim 1, wherein the signal compensating for friction has a substantially constant amplitude.

6. The method as claimed in claim 5, wherein the amplitude of the signal compensating for friction is 1–10% of the controlling range of the control signal.

7. Use of a method as claimed in claim 1 for controlling a control valve.

8. Use as claimed in claim 7, wherein the control valve is pneumatically controlled.

9. A control system for compensating for static friction in an actuating means, comprising a means for sensing a quantity which is controllable by the actuating means, an actual value means for generating an actual value signal based on the sensed quantity, a set value means for generating a set value signal, a controller for generating a control signal based on the set value signal and the actual value signal, and a compensator, which intermittently generates a signal compensating for friction and adds this signal to the control signal and feeds the thus formed signal to the actuating means, wherein the signal generated by the compensator has the same sign as the derivative with respect to time of the control signal at the time of generation.

\* \* \* \* \*